United States Patent [19]
Booth et al.

[11] Patent Number: 5,551,467
[45] Date of Patent: Sep. 3, 1996

[54] BALL VALVE WITH CONTROLLED FLOW VARIATION

[75] Inventors: Walter Booth, East Hanover; Alan R. Levin, Somerville, both of N.J.

[73] Assignee: H-Tech, Inc., Wilmington, Del.

[21] Appl. No.: 514,317

[22] Filed: Aug. 11, 1995

[51] Int. Cl.$^6$ .............................. F16K 47/04; F16K 5/12
[52] U.S. Cl. .............. 137/1; 137/270; 251/209; 251/315.01; 251/315.05; 251/315.16
[58] Field of Search ................. 251/209, 315.01, 251/315.03, 315.05, 315.16, 208, 366; 137/270, 1

[56] References Cited

U.S. PATENT DOCUMENTS

| | | | |
|---|---|---|---|
| 3,016,062 | 1/1962 | Zinniger | 137/270 |
| 3,403,887 | 10/1968 | Myers | 251/209 |
| 3,542,338 | 11/1970 | Scaramucci | . |
| 3,591,129 | 7/1971 | Hulsey | . |
| 3,773,291 | 11/1973 | Grauer | 251/209 XR |
| 4,881,718 | 11/1989 | Champagne | 251/209 |

OTHER PUBLICATIONS

Hayward, "¼"-2" Safe Block™ True Union Ball Valves", Hayward Product Catalogue, pre-1982.
DURCO, Duriron Company Advertisement in Nov. 1995 issue of "Processing" magazine.

*Primary Examiner*—Kevin Lee
*Attorney, Agent, or Firm*—Selitto & Associates

[57] ABSTRACT

A device for controlling fluid flow through a conduit includes a ball valve with a ball having a conduit terminating at an end thereof in an outlet orifice having a non-circular shape. The orifice shape is compound and may be selected to linearize the flow/ball angle relationship. The ball may be reversible to permit reversing the flow change dynamic and may also be a flow reducer.

14 Claims, 5 Drawing Sheets

BALL VALVE WITH CONTROLLED FLOW VARIATION

FIELD OF THE INVENTION

The present invention relates to fluid control valves, and more particularly to ball valves.

BACKGROUND OF THE INVENTION

Ball valves have been used for many years to control the flow of fluids. In its simplest from, a ball valve includes a valve body with a fluid passageway therethrough. A rotatable sphere or spheric segment, "ball", with its own fluid conduit is sealingly received in a mating "socket" in the valve body. The rotatable sphere is positioned within the valve body in the fluid passageway. When the conduit in the ball is aligned with the fluid passageway through the valve body, fluid may flow through the valve. If the ball is rotated such that the ball conduit is out of alignment with the valve body passageway, then the flow is restricted. The "off" position usually corresponds to a position of the ball wherein the conduit is at right angles to the valve body passageway. Lesser angular displacements may result in an "off" condition, however, depending upon the geometry of the valve components. The "fully on" position is typified by the ball conduit being coaxially aligned with the fluid passageway of the valve body. A ball valve can provide varying degrees of flow restriction based upon the degree of alignment of the ball conduit with the valve body passageway. Thus, for a given pressure, flow can be controlled by varying the effective orifice resulting from the degree of alignment of the ball conduit with the valve body passageway. The purpose of a fluid control valve is therefore twofold, viz., to turn the flow on and off and also to provide a desired flow rate through the valve at any given pressure.

A ball valve is usually actuated through a stem which passes through the valve body and attaches to the ball. A handle or some other means turning the stem, such as a gear, may be provided on the other end of the stem. The amount of fluid passing through the ball valve changes as the valve is actuated, for example, opened or closed. The rate of change of the flow depends upon two factors, viz., the rate of rotation of the stem and the area of alignment of the ball passageway with the valve body passageway. The area exposed is intrinsic to the valve, based upon its geometry. A particular angular orientation of the ball corresponds to a particular degree of conduit/passageway alignment and flow rate. Conventional ball valves have a rate of alignment characteristic of a pair of cylindrical conduits, one of which (ball conduit) is rotated into coaxial alignment with the other (valve body passageway).

In certain fluid control applications, however, it would be desirable to have a different rate of flow change than that provided by the conventional ball valve. e.g., for the transition from one flow rate to a greater or lesser rate to be as quick as possible. In other instances, a modest change in flow associated with a given angular displacement of the ball is desirable. It would also be desirable to have a valve that controlled the rate of flow therethrough as a linear function of ball orientation such that a change in ball orientation of a number of degrees would result in a predictable change in flow. This linear relationship would be particularly useful in automatically controlled valves wherein a digital controller or computer determines the position of the valve in response to systems demands, e.g., in an automated chemical processing operation. None of the foregoing desirable attributes are associated with common cylindrical conduit ball valves.

In certain applications, a given fluid system has multiple uses, e.g., a system that is used to fill containers with different fluids, different fluid viscosities and/or filling different sized and/or shaped containers with the same fluid. Accordingly, in those systems with varying fluid dynamic requirements relating to flow change, it is desirable to have a control valve which is adaptable to the various requirements without need for changing valves or for redirecting fluid flow through a different valve.

Similarly, there are circumstances when a fluid system with a given flow capacity, e.g., based upon pipe size and valve size would preferably be adapted to produce a lesser flow and then be readaptable to return to the original flow rate as determined by the hydrodynamic capacity of the pipeline. Furthermore, a fluid system with reduced flow would preferably have a controlled flow rate of change.

It is therefore an object of the present invention to provide a ball valve with a desired angular displacement/flow volume relationship, e.g., an approximately linear relationship, wherein a given number of degrees of ball valve movement corresponds with a given flow volume increase/decrease. It is a further object to provide such a ball valve without substantially sacrificing maximum flow volume, a ball valve which is capable of providing more than one flow change dynamic and a ball valve which can be used to selectively control overall system flow capacity while simultaneously providing control over flow rate change dynamics.

SUMMARY OF THE INVENTION

The problems and disadvantages associated with the conventional techniques and devices utilized to control fluid flow through a fluid conduit system are overcome by the present invention which includes a ball valve having a valve body with a fluid passageway therethrough. A ball with a conduit therein is disposed within the valve body in the fluid passageway for regulating a fluid flow therethrough. The position of the ball and its conduit are regulated relative to the fluid passageway to regulate the fluid flow through the valve. The ball conduit terminates at an end thereof in an outlet orifice having a non-circular shape.

BRIEF DESCRIPTION OF THE FIGURES

For a better understanding of the present invention, reference is made to the following detailed description of exemplary embodiments considered in conjunction with the accompanying drawings, in which.

DETAILED DESCRIPTION OF THE FIGURES

Figure 1:
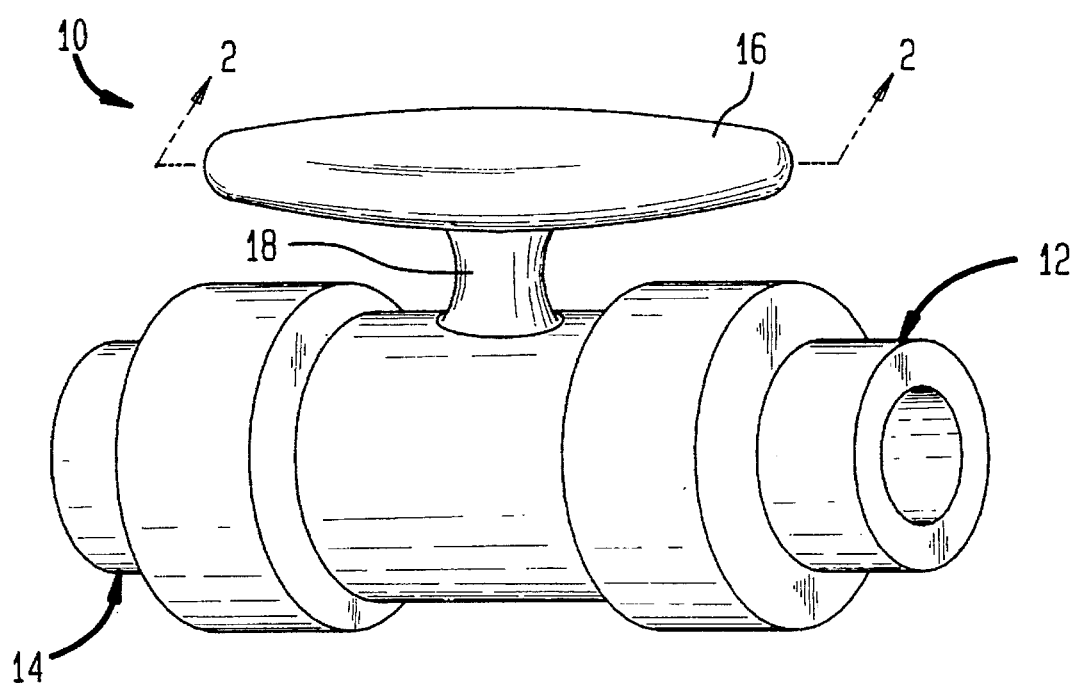
FIG. 1 is a perspective view of a ball valve in accordance with an exemplary embodiment of the present invention.

FIG. 1 shows a ball valve 10 in accordance with the present invention. The ball valve is intended to be inserted into a pipeline for carrying fluid. In the alternative, it may be affixed to the end of a pipeline, fluid conduit or to a fluid receptacle, such as a tank. The valve has an inlet 12 and an outlet 14. The inlet and outlet 12, 14 are provided with threads or flanges, as is conventional in this art, for forming connections to the inlet and outlet piping or receptacle nipple. An actuator handle 16 projects from the valve 10 on a stem 18 which enters the interior of the valve. The handle permits the user to turn the stem 18 to control the opening and closing of the valve 10. In the alternative, a gear or other suitable mechanical linkage such as a connecting rod may connect the stem to an electric motor, solenoid, stepper motor or like robotic/automatic electronic control device to effect rotation thereof. In automated systems, the state of openness of the valve may be therefore be controlled by a computer directing the operation of the electronic stem rotator.

Figure 2:
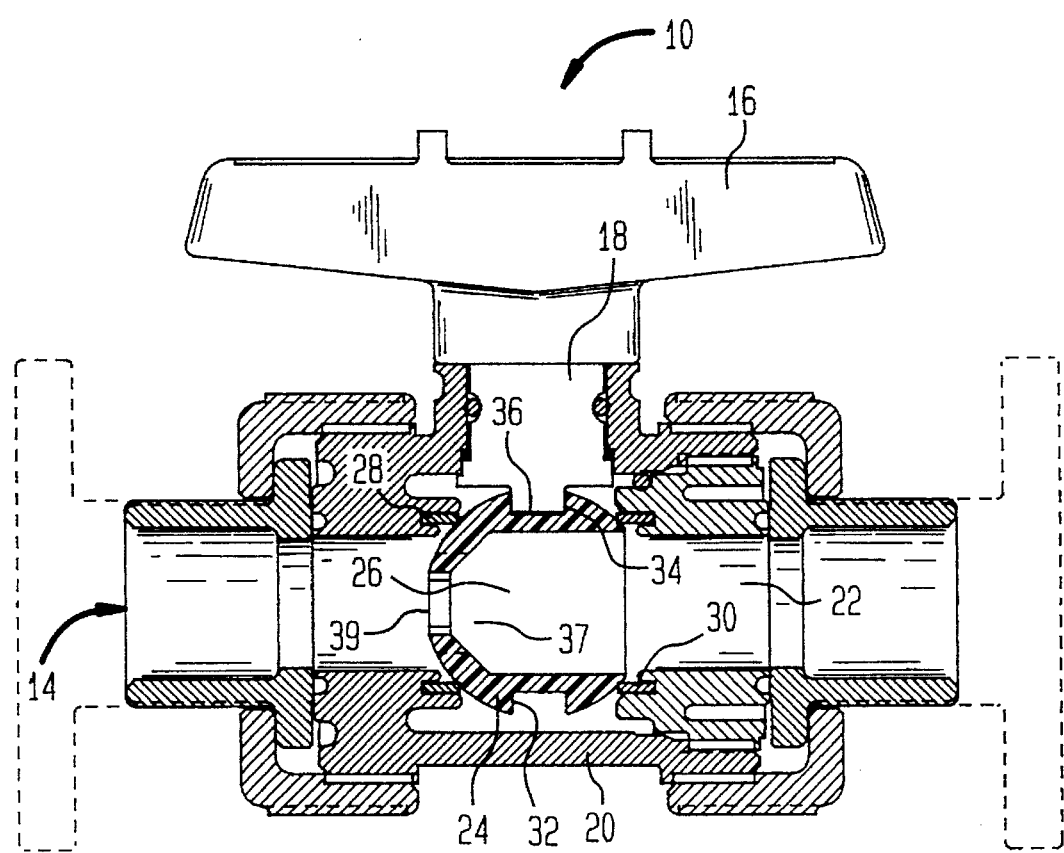
FIG. 2 is a cross-sectional view of the valve of FIG. 1 taken along section line 2—2 and looking in the direction of the arrows.

FIG. 2 shows the ball valve 10 of FIG. 1 in cross-section. A valve body 20 has a fluid passageway 22 therethrough for conducting a fluid flow to be controlled. Preferably the fluid passageway 22 has a cross-sectional size approximating that of the fluid handling system in which it is installed. For example, in the case of controlling the flow through a 4 inch pipe system, it is typical and preferable to install a ball valve which has an effective flow capacity equivalent to a 4 inch pipe. In this manner, the ball valve does not constitute a flow restriction in the line. On occasion however, a fluid handling system is designed with oversize piping, either through mistake or by virtue of a change in fluid handling input or output requirements. The present invention may play a role in adapting an oversize piping system to a lower flow capacity system, as shall be explained more fully below.

Referring again to FIG. 2, the valve 10 includes a ball 24 having a fluid conduit 26 which, when aligned with the fluid passageway 22 of the valve body 20, permits fluid to pass through the valve 10. The ball 24 is rotatable about the axis of the stem 18. A fluid seal is maintained by a pair of opposing seals 28, 30 on either side of the ball 24. The stem 18 coacts with the ball 24 via one of a pair of slots 32, 34 in the ball which accommodate a key prominence 36 of the stem 18. A pair of slots 32, 34 are provided to enable the ball 24 to be reversed in position resulting in an opposite opening and closing dynamic as shall be explained more fully below. The ball conduit 26 has a frusto-conical portion 37 terminating in a discharge orifice 39 through the ball 24 that, in the open position, discharges into the outlet 14 of the valve body 20. One could alternatively state that the discharge orifice 39 penetrates the frusto-conical portion 37. Because the frusto-conical portion converges to the discharge orifice, i.e., tapers down from the fluid conduit 26, it reduces the maximum fluid flow volume through the conduit 26. As can be appreciated, the exterior surface of the ball 24 proximate the frusto-conical portion 37 is spheric. The interior surface of the ball 24 in the area 37 could be spheric as well, but the frusto-conical shape performs a nozzle function.

As noted above, the change in flow rate for a given angular displacement of the ball 24 is dependent upon the relative change in alignment of the ball conduit 26 with the valve body passageway 22. Assuming that both the conduit 26 and the passageway 22 are straight and cylindrical, the flow change dynamic associated with a change in valve position would be dependent upon the relative alignment of two circles.

As can be readily appreciated, the degree of relative alignment of a pair of circles rotated past each other varies greatly (geometrically) as they pass into and out of alignment. For example, it can be seen that when two circles first begin to come into alignment, a given amount of angular displacement will result in less aligned area than the same amount of displacement when the circles approach 30% cross-sectional area alignment. As a result, the change in flow for a given angular displacement of a common ball valve varies greatly over its range of travel. This flow change can constitute a problem in certain fluid systems, particularly those employing automated valve controls.

In automated systems, it is preferred that a given angular displacement will result in a given flow volume change, with this relationship remaining stable throughout the range of travel of the valve. So, e.g., if it is known that a ball valve will increase/decrease flow by 5 gallons per minute for each 5 degrees of rotation of the ball, then a computer monitoring the system can immediately translate a demand for 10 more gallons per minute into a valve rotation of 10 degrees, assuming that the maximum flow level has not been reached. In contrast, a valve that has a geometric relationship between valve position and flow volume must be directed by a program that calculates flow changes based upon the geometric relationship and/or a table of values that have been theoretically or experimentally derived and/or must use sensory feedback from a flow meter or fluid level sensor. Since these latter expedients add to the complexity and expense of a given system, they are not preferred.

Figure 3:
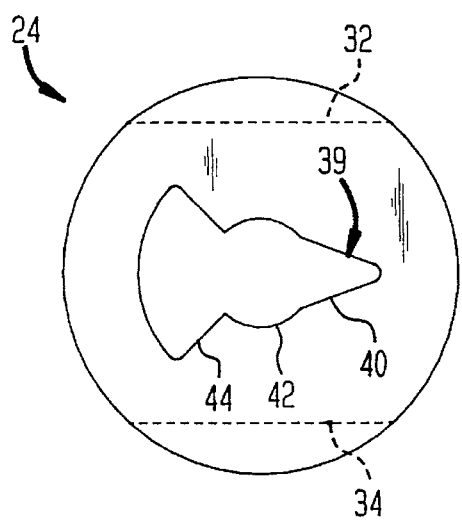
FIG. 3 is a front view in elevation of the ball of the valve shown in FIG. 2.

FIG. 3 illustrates a ball 24 in accordance with a first exemplary embodiment of the present invention. The ball 24 has a discharge orifice 39 having a compound shape. The orifice 39 shape can be used to control the rate of change of fluid flow through the valve relative to the change in angular orientation of the ball 24. The compound orifice 39 shape will have a different rate of coming into alignment with a circular orifice provided by the valve body passageway 22 than a conventional, circular orifice. More specifically, the orifice 39 has three distinct portions, a triangular portion 40, a circular portion 42 and a fan-shaped portion 44. It has been determined that an orifice having these shapes in the sequence and relative proportions shown will exhibit a linearized flow change dynamic. As noted above, the ball 24 has an upper and lower notch 32, 34, signified by dotted lines, to allow reversal of the ball within its "socket" in the valve body 20 which is effectively formed by the opposing seals 28, 30. The reversal feature permits the ball valve 10 to be reconfigured to reverse the opening and closing flow change pattern for different uses without replacing the valve 10. Similarly, a supplier of valves can stock one valve which can be configured two different ways with flow patterns to suit different fluid systems.

Figure 4:
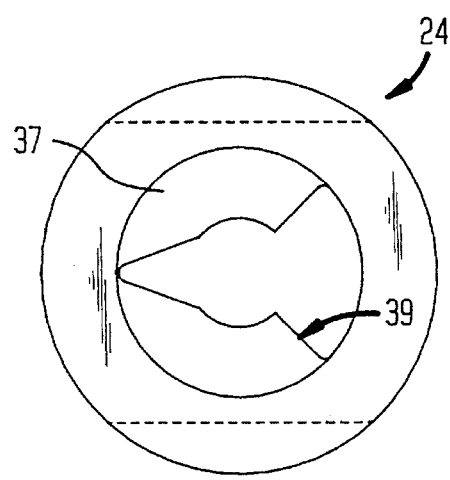
FIG. 4 is a rear view in elevation of the ball of FIG. 3.

FIG. 4 shows the relationship between the orifice 39 and the maximum possible outlet size, as represented by the outer periphery of the frusto-conical portion 37 of the ball conduit 26. The compound shaped orifice 39 is smaller than the maximum possible size and therefore the ball 24 constitutes a flow restriction if the ball conduit 26 is selected to be of the same size as the pipeline. In the alternative, if the conduit is selected to be a larger size than the pipeline, then the orifice may have an effective maximum open area as large as the pipeline, thereby eliminating any flow restriction effect. The potential flow restriction function performed by the exemplary embodiments shown in FIG. 3–6 may be utilized to both achieve a different flow rate dynamic and to reduce the flow of fluid through the system. This use finds utility in circumstances where the fluid lines have been oversized or have been modified to a different use requiring less flow and/or greater control.

Figure 5:
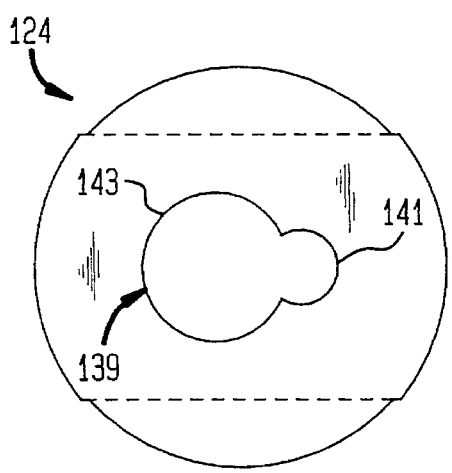
FIG. 5 is a from view in elevation of an alternative embodiment of the ball of FIG. 4.
Figure 6:
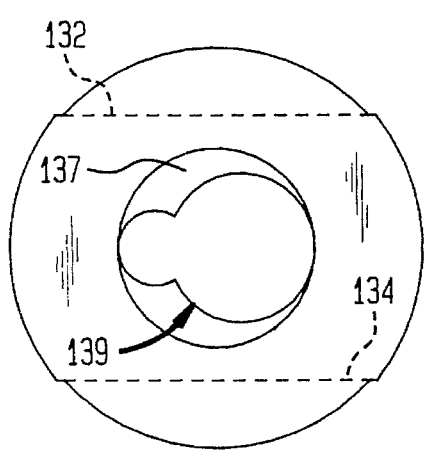
FIG. 6 is a rear view in elevation of the ball of FIG. 5.

FIGS. 5 and 6 show an alternative embodiment 124 of the ball 24 of FIG. 3 and 4. The orifice 139 is formed by a pair of overlapping bores 141, 143 through the frusto-conical portion 137. This embodiment also exhibits a linearizing effect due to the graduated, compound shape of the orifice 139. The balls 24, 124 of FIGS. 3-6 can be formed by an injection molding process or by drilling, cutting or machining the orifice 39, 139.

Figure 7A:
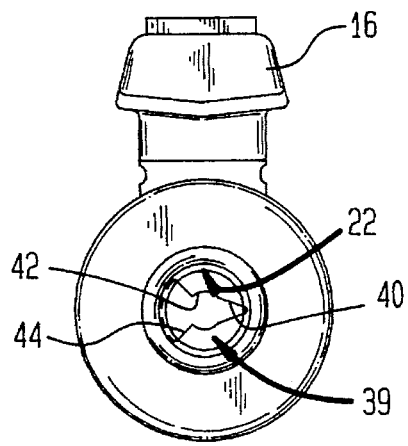
FIG. 7A–7E are a series of schematic sequential views of the ball of FIG. 2 through the outlet port of the ball valve as the ball is rotated through a range of orientations.
Figure 7B:
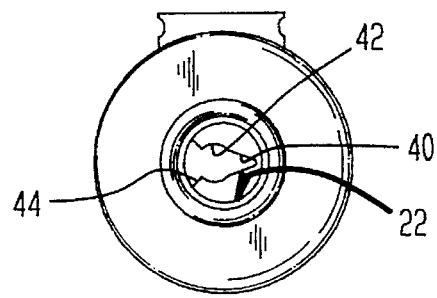
Figure 7C:
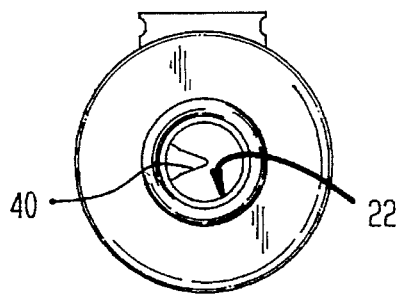
Figure 7D:
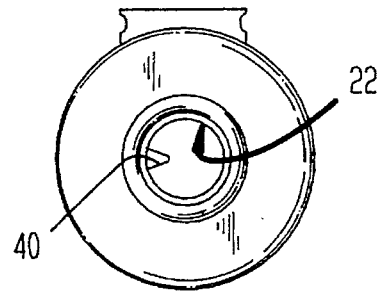
Figure 7E:
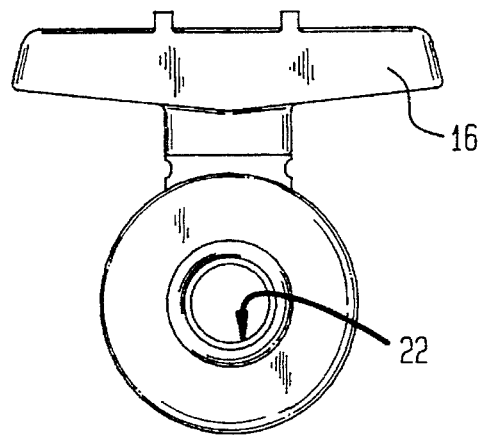

FIGS. 7A–7E illustrate a ball valve in accordance with the present invention at different stages of rotation starting with FIG. 7A showing the handle parallel with the fluid passage 22 and fully open, to the position of FIG. 7E where the handle 18 and ball conduit 26 are at right angles to fluid passageway 22 and fully closed. A rotation limit through 90 degrees of travel established by stops on the handle and valve body is common in the industry and establishes an easily verifiable open and closed position. As can be appreciated from FIGS. 7A–7E, the orifice 39 shape causes a varying degree of orifice 39 alignment with the fluid passageway 22 depending upon ball 24 orientation (which corresponds to handle 18 angle). In this series of drawings, the handle 18 is rotated clockwise from fully open portion (zero degree) to fully closed (ninety degrees). The orifice 39 is of the shape described above in reference to FIGS. 3 and 4 and progresses from right to left from substantially complete alignment with passageway 22 to non-alignment (see FIG. 7E). Because the orifice 39 shape and degree of cross-sectional alignment varies, any given angular displacement of the ball 24 will produce varying change in cross-sectional alignment (and if under constant pressure a varying change in flow). Given the orifice 39 shape and rotation direction shown in FIGS. 7A–7E, it is clear that roughly the same angular displacements will cause (1) the fan-shaped portion 44, (2) the circular portion 42 and the triangular portion 40 to go out of alignment with the passageway 22. Since the cross-sectional area of the fan-shaped portion 44 is larger then the circular portion 42 the first rotational displacement that causes the fan portion to go out of alignment will result in a greater reduction in alignment/flow than the displacement that causes the circular portion 42 to be occluded. Similarly, triangular portion 40 will cause a less severe flow change than the circular portion 42. As a result, the valve 10 shown in FIGS. 7A–7E will exhibit a first rapid decrease in flow followed by more gradual decreases as the valve is turned off. When the valve 10 is turned on, the increase will be gradual and then rapid as the handle is turned counter-clockwise. If the ball 24 is reversible such that the triangular portion 40 is first to shut off and last to turn on, then the flow change dynamics will be reversed.

Figure 8:
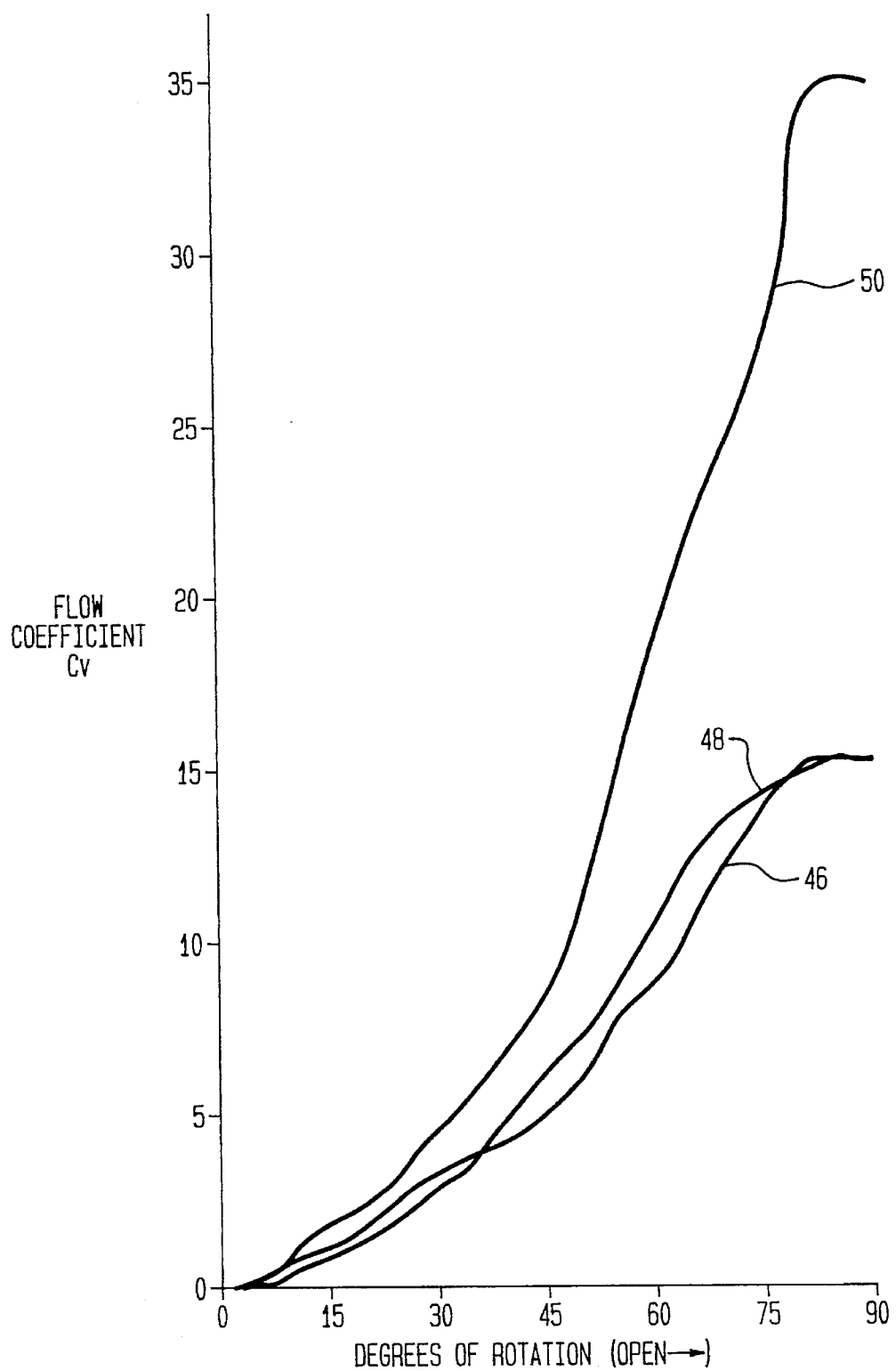
FIG. 8 is a graph of flow coefficient vs. ball orientation angle for a conventional ball valve and for a ball valve in accordance with the present invention.

The graph shown in FIG. 8 illustrates the fluid dynamics associated with the present invention as compared to those associated with conventional ball valves. Lines 46 and 48 graph the flow coefficient associated with the range of valve open conditions as represented by the degree of angular rotation of the handle from a closed position to an open position, with 0 degrees displacement taken as fully closed and 90 degrees displacement as fully open. The slope of lines 46 and 48 is approximately constant. In contrast, line 50 representing the graph of flow coefficient to handle displacement (in degrees) of a conventional ball valve has a widely varying slope. It can be noted that the flow coefficient of the present invention ball valve at full open is less than that of the conventional ball valve at full open position, illustrating the flow restriction effect which may be achieved with the present invention control ball valve. As noted above, the restriction effect can be eliminated by using a larger valve.

It should be understood that the embodiments described herein are merely exemplary and that a person skilled in the art may make many variations and modifications without departing from the spirit and scope of the invention as defined in the appended claims.

We claim:

1. A method for controlling flow volume through a fluid conduit system, comprising the steps of:

(a) installing a ball valve in said conduit system, said ball valve having a control ball with a conduit therein terminating at an end thereof in an outlet orifice having a non-circular shape, said orifice shape determining the rate of flow at a selected ball orientation, the relationship between the angular orientation of said ball and fluid flow differing from that of a ball valve having a circular outlet orifice;

(b) actuating said valve to position said ball at a selected orientation, said ball being reversible to provide one of two alternative angular orientation/fluid flow relationships; and (c) selecting one of said two alternative relationships by reversing or not reversing said ball.

2. The method of claim 1, wherein said ball conduit has a generally cylindrical portion and a frusto-conical portion, said orifice penetrating said frusto-conical portion, said orifice having a smaller cross-sectional area than said generally cylindrical portion of said ball conduit rendering said ball valve a flow reducer said frusto-conical portion converging toward said orifice to reduce maximum fluid flow volume through said conduit system.

3. The method of claim 1, wherein said step of actuating results in an approximately linear angular orientation/fluid flow relationship.

4. The method of claim 1, wherein said angular orientation/fluid flow relationship is characterized by providing a rapid increase in fluid flow per degree of rotation upon opening, followed by a gradual increase in fluid flow as said valve reaches a fully opened state.

5. The method of claim 1, wherein said angular orientation/fluid flow relationship is characterized by providing a gradual increase in fluid flow per degree of rotation upon opening, followed by a rapid increase in fluid flow as said valve reaches a fully opened state.

6. A ball valve, comprising:

(a) a valve body having a fluid passageway therethrough;

(b) a ball with a conduit therein disposed within said valve body in said fluid passageway for regulating a fluid flow therethrough; and (c) means for controlling the position of said ball and said conduit relative to said fluid passageway to regulate the fluid flow through said valve, said ball conduit terminating at an end thereof in an outlet orifice having a non-circular shape with a plurality of distinct portions including a triangular portion, a circular portion and a fan-shaped portion defining the peripheral shape of said orifice, the relationship between the angular orientation of said ball and the fluid flow differing from that of a ball valve having a circular outlet orifice.

7. A ball valve in accordance with claim 6, wherein said ball is an injection-molded plastic.

8. A ball valve, comprising:
   (a) a valve body having a fluid passageway therethrough;
   (b) a ball with a conduit therein disposed within said valve body in said fluid passageway for regulating a fluid flow therethrough; and
   (c) means for controlling the position of said ball and said conduit relative to said fluid passageway to regulate the fluid flow through said valve, said ball conduit terminating at an end thereof in an outlet orifice having a non-circular shape, the relationship between the angular orientation of said ball and the fluid flow differing from that of a ball valve having a circular outlet orifice, said ball being reversible to provide one of two alternative angular orientation/fluid flow relationships.

9. A ball valve in accordance with claim 8, wherein said angular orientation/fluid flow relationship is linearized.

10. A ball valve in accordance with claim 8, wherein said ball conduit has a generally cylindrical portion and a frusto-conical portion, said orifice penetrating said frusto-conical portion, said orifice having a smaller cross-sectional area than said cylindrical portion of said ball conduit.

11. A ball valve in accordance with claim 10, wherein said smaller cross-sectional area of said orifice relative to said cylindrical portion of said ball conduit renders said ball valve a flow reducer.

12. A ball valve in accordance with claim 8, wherein said angular orientation/fluid flow relationship is characterized by providing a rapid increase in fluid flow per degree of rotation upon opening, followed by a gradual increase in fluid flow as said valve reaches a fully opened state.

13. A ball valve in accordance with claim 8, wherein said angular orientation/fluid flow relationship is characterized by providing a gradual increase in fluid flow per degree of rotation upon opening, followed by a rapid increase in fluid flow as said valve reaches a fully opened state.

14. A ball valve in accordance with claim 8, wherein said means for controlling the position of said ball includes a pair of opposed notches on either side thereof for alternatively selectively accommodating a key protruding from a rotatable stem.

\* \* \* \* \*

UNITED STATES PATENT AND TRADEMARK OFFICE
CERTIFICATE OF CORRECTION

PATENT NO. : 5,551,467
DATED : September 3, 1996
INVENTOR(S) : Walter Booth, Alan R. Levin It is certified that error appears in the above-indentified patent and that said Letters Patent is hereby corrected as shown below:

Column 1, line 40, after "means", insert --for--.

Column 1, line 40, delete "stern" and insert --stem--.

Signed and Sealed this

Nineteenth Day of November, 1996

Attest:

BRUCE LEHMAN

*Attesting Officer*  *Commissioner of Patents and Trademarks*